K. Goddard,
Coating Ice Pitchers.
No. 97,390. Patented Nov. 30, 1869.
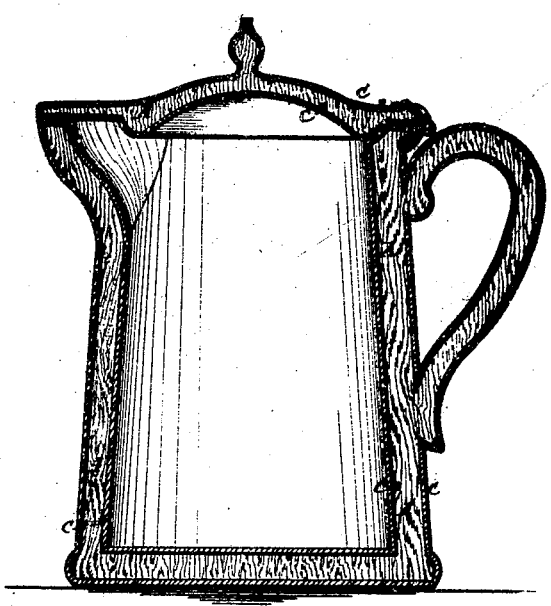
Witnesses:
A. W. Almquist
Wm. F. Clark
Inventor:
Reid Kingslow Goddard
Per Mmmm
Attorneys.

United States Patent Office.

KINGSTON GODDARD, OF RICHMOND, NEW YORK.

Letters Patent No. 97,390, dated November 30, 1869.

IMPROVED MODE OF CONSTRUCTING WATER-PITCHERS AND OTHER VESSELS.

The Schedule referred to in these Letters Patent and making part of the same.

*To all whom it may concern:*

Be it known that I, KINGSTON GODDARD, of Richmond, in the county of Richmond, and State of New York, have invented a new and useful improvement in Ice-Pitchers; and I do hereby declare that the following is a full, clear, and exact description thereof, which will enable others skilled in the art to make and use the same, reference being had to the accompanying drawings, forming part of this specification.

The figure is a vertical section of my improved pitcher.

My invention has for its object to furnish a simple, neat, durable, light, and inexpensive ice-pitcher, which shall have all the beauty and durability of a solid silver pitcher, and may be manufactured at trifling cost; and It consists in a pitcher or other vessel, formed by electro-plating the body of vessel made of wood or other non-conducting material, with one or more metals, as hereinafter more fully described.

A is the body of the pitcher, which may be turned out of a single piece of wood. The wooden body A is then covered or coated with plumbago, or other suitable substance that will enable the said body to be placed in the bath without injury.

The body A may be first coated with copper, B, or other cheaper metal, to give body to the pitcher. Afterward the pitcher is coated with silver, C. By this construction, the wooden body A serves as a non-conductor, enabling the pitcher to be used with advantage as a water-pitcher or cooler.

The handle and spout of the pitcher may be formed and attached to the pitcher before it is electro-plated.

The cover is formed in the same manner as the body of the pitcher, and is then hinged to it in the ordinary manner.

The electro-plating is done by the ordinary processes. This I do not claim; but

What I claim as my invention, and desire to secure by Letters Patent, is—

An improved ice-pitcher, or other vessel, formed by electro-plating, with one or more metals, a body made of wood or other suitable non-conducting material, substantially as herein shown and described, and for the purpose set forth.

The above specification of my invention signed by me, this 31st day of August, 1869.

KINGSTON GODDARD.

Witnesses:
  GEO. W. MABEE,
  JAMES T. GRAHAM.